United States Patent [19]

Rouse et al.

[11] Patent Number: 4,683,563
[45] Date of Patent: Jul. 28, 1987

[54] DATA COMMUNICATION NETWORK

[75] Inventors: David M. Rouse, Columbus; Richard E. Wallace, Newark; Charles M. Zelms, Worthington, all of Ohio

[73] Assignee: American Telephone and Telegraph Company, AT&T Bell Laboratories, Murray Hill, N.J.

[21] Appl. No.: 660,015

[22] Filed: Oct. 11, 1984

[51] Int. Cl.⁴ .............................................. H04J 1/16
[52] U.S. Cl. ........................................ 370/16; 370/88
[58] Field of Search ........................... 370/86, 88, 16; 340/825.05

[56] References Cited

U.S. PATENT DOCUMENTS

| | | | |
|---|---|---|---|
| 3,586,782 | 6/1971 | Thomas | 179/15 |
| 3,597,549 | 8/1971 | Farmer et al. | 179/15 |
| 3,748,647 | 7/1973 | Ashany et al. | 340/172.5 |
| 3,821,713 | 6/1974 | Broadhurst | 340/172.5 |
| 3,890,471 | 6/1975 | Hachenburg | 179/15 |
| 4,112,488 | 9/1978 | Smith | 364/200 |
| 4,354,267 | 10/1982 | Mori et al. | 371/11 |
| 4,380,061 | 4/1983 | Mori et al. | 370/16 |
| 4,383,314 | 5/1983 | Tam | 370/86 |
| 4,413,338 | 11/1983 | Renoulin | 370/89 |
| 4,542,496 | 9/1985 | Takeyama et al. | 370/16 |
| 4,553,233 | 11/1985 | Debuysscher et al. | 370/16 |
| 4,573,044 | 2/1986 | McConachie et al. | 370/16 |
| 4,575,843 | 3/1986 | David et al. | 370/16 |

OTHER PUBLICATIONS

"IBM's Local Network Scheme", W. Rauch-Hindin, Data Communications, May 1982, p. 65.
"Token-Passing Protocol Boosts Throughout in Local Networks", J. A. Murphy, Electronics, Sep. 8, 1982, p. 158.
"A Distributed Processing System for Military Applications-Part 1: System Overview", Ralph Mauriello, Computer Design, Sep. 1980, p. 14.

Primary Examiner—Douglas W. Olms
Assistant Examiner—Kenneth I. Rokoff
Attorney, Agent, or Firm—Dwight A. Marshall

[57] ABSTRACT

A data communication network comprising ring transmission paths (0,1) interconnecting ring interface nodes (RI1, RI2, RI3) coupled with a node processor and data systems and arranged to propagate data messages along the ring transmission paths between the data systems. Each node is arranged to detect failure of the node to propagate a data message to another node and to flush the data communication network by force reading data messages off the ring transmission paths into the blocked node processor. A node is arranged to automatically maintain and restore operation of the data communication network by loop connecting ones of the ring transmission paths together to isolate segments of the network experiencing trouble and to transfer maintenance and diagnostic data messages between ones of the looped ring transmission paths to restore ring transmission paths and nodes located in isolated segments of the network to service.

25 Claims, 11 Drawing Figures

DATA MESSAGE

DATA COMMUNICATION NETWORK

FIELD OF THE INVENTION

This invention relates to data communication networks. In particular, it relates to a data communication network arranged to isolate segments of the network experiencing difficulty in handling data messages generated by data systems coupled with the network.

BACKGROUND OF THE INVENTION

Data communication networks are oftentimes used to interconnect data systems which use the networks to send and received data. Typically, such data communication networks may comprise ring transmission paths interconnecting ring interface nodes that are used to couple data systems with ring transmission paths. Data is usually transmitted from an originating data system to a ring interface node, oftentimes referred to simple as a node, and over a ring transmission path through intermediate nodes to a node coupled with a receiving data system.

In ring type of data communication networks a node may experience circuit and component failures or a ring transmission path may open thereby causing the network to become inoperative. In the past, attempts have been made to increase the reliability of such types of networks by providing alternative ring transmission paths. Thus, a ring type of data communication network may be designed with ring transmission paths arranged to transmit data in one direction around the network and other ring transmission paths arranged to transmit data in an opposite direction. In the event a node or ring transmission path experiences trouble ones of the ring tranmission paths are looped together at another part of the network to isolate that part of the network experiencing difficulties. A problem arises in these types of data communication networks in that the part of the data communication network that continues in operation generally has no way to communicate with the isolated segment of the network thereby delaying diagnosis of the trouble symptoms and the restoration of the isolated segment to network service.

The foregoing and other problems are solved and a technical advance is achieved by a data communication network arranged to isolate a part of the network experiencing trouble and maintain data communication with the isolated segment to assist in diagnosis and restoral of the isolated segment to network service.

SUMMARY OF THE INVENTION

In the exemplary embodiment of the invention a data communication network has ring transmission paths interconnecting nodes each coupled with a node processor and data systems for use in the transmission of data messages between the data systems. A method for maintaining the network and node apparatus detecting a failure of propagating a data message on a ring transmission path is arranged to isolate segments of the data communications network by enabling the node to loop connect ones of the ring transmission paths together to isolate a segment of the network. The method and maintenance apparatus of a node enables the node to read diagnostic data messages off of one loop connected ring transmission paths into the node processor and write the diagnostic data messages from the node processor onto another of the loop connected ring transmission paths to maintain and restore the isolated segment to data communication system service.

In accordance with one feature of the invention a method for maintaining a data communication network having ring transmission paths interconnected by nodes each coupled with a node processor and data systems comprises the steps of flushing the network of data messages by force reading the data messages off the ring transmission paths at a node into the node processor and isolating segments of the flushed network by enabling nodes to loop connect ones of the ring transmission paths. The method further comprises the step of communicating with ones of the nodes located in an isolated segment of the network by transferring diagnostic data messages between the node processor and loop connected ring transmission paths to maintain and restore the data communication network to normal operation.

In accordance with another feature of the invention a method for maintaining a data communication network having ring transmission paths interconnected by nodes each coupled with a node processor and data systems comprises the steps of detecting a failure of a receiving node to take a byte of a data message from a propagating node by timing the interval between successive bytes of data messages propagated on outgoing ring transmission paths. The method also includes the steps of signaling the node processor that a blockage of a propagating node has occurred when the timing interval exceeds a predefined value and inhibiting the node from propagating the blocked data messages on the outgoing ring transmission paths. The method further enables the node to read bytes of the blocked data message and data messages off of incoming ring transmission paths into the node processor.

In accordance with another feature of the invention a method for maintaining a data communication network having ring transmission paths interconnecting nodes each coupled with a node processor and data systems comprises the steps of interconnecting an incoming ring transmission path normally coupled with one outgoing ring transmission path with another outgoing ring transmission path and transferring control of node apparatus for generating data available signals on the one outgoing ring transmission to the other outgoing ring transmission path.

In accordance with another feature of the invention a method for maintaining a data communication network having loop connected ring transmission paths at nodes of the nentwork to isolate a segment of the network comprises steps for receiving successive bytes of diagnostic data messages from set of loop connected ring transmission paths and transferring the diagnostic data to another set of loop connected ring transmission paths to maintain and restore the data communication network.

In accordance with another feature of the invention a node for maintaining a data communication network having ring transmission paths interconnecting the nodes each coupled with a node processor and data systems comprises apparatus for detecting failure of a receiving node to take a data message from a propagating node. Apparatus of the node responsive to detecting failure of the node in propagating a data message flushes the data communication network of data messages and isolates segments of the network experiencing trouble by loop connecting ones of the ring transmission paths together to isolate the segment from an active part of the network. The node is able to communicate with isolated ones of the nodes by reading bytes of diagnostic data messages off ones of the looped connected ring transmission paths into the node processor and writing bytes of the read diagnostic data messages from the node processor onto others of the loop connected ring transmission paths to diagnose and restore the isolated segment of the data communication network to active operation.

In accordance with another feature of the invention a node for maintaining a data communication network having ring transmission paths interconnected by ones of the nodes each coupled with a node processor and data systems comprises apparatus for timing an interval of time between when a byte of a data message is available and is taken by a receiving node. When the timing apparatus exceeds a predetermined interval of time the node is arranged to signal the associated node processor that a blockage has occurred in propagating a data message and the node is inhibited from propagating successive bytes of the blocked data message on a ring transmission path.

In accordance with another feature of the invention a node for maintaining a data communication network having ring transmission paths interconnected by the nodes each coupled by a data bus with a node processor and having detected a blockage in propagating a data message comprises apparatus for flushing the network by force reading bytes of the blocked data messages and succeeding data messages off of incoming ring transmission paths over the data bus into the blocked node processor. Apparatus of the blocked node is further arranged to loop connect an outgoing ring transmission path normally coupled with an incoming ring transmission path to another incoming ring transmission path to isolate a segment of the network and transfers control of apparatus for generating data available signals normally associated with the incoming ring transmission path to the other incoming ring transmission path loop connected with the outgoing ring transmission path.

In accordance with another feature of the invention a node for maintaining a data communication network and having loop connected ring transmission paths to isolate a segment of the network experiencing trouble comprises apparatus for receiving successive bytes of a diagnostic data message on one of loop connected transmission paths and transferring the diagnostic data message to other loop connected ring transmission paths by propagating each diagnostic data byte in a parallel bit format on the outgoing ring transmission path of the other loop connected ring transmission paths.

DESCRIPTION OF THE DRAWING

The foregoing as well as other objects, features and advantages of the invention will be more apparent from a description of the drawing in which.

The detailed logic circuitry of the data commmunication network node set forth in FIGS. 4 through 11 of the drawing, is performed by logic gates and registers, the operation of which are well-known in the art. Details of similar gates and registers are described by J. Millman and H. Taub in the text book *Pulse, Digital and Switching Waveforms,* 1965, McGraw-Hall, Inc., and in *The TTL Data Book for Design Engineers,* Second Edition, 1976, Texas Instruments Incorporated.

For the purpose of illustration FIGS. 6 through 11 of the drawing employ apparatus set forth in a type of data communication network disclosed by M. L. Blood et al. in a copending application Ser. No. 560,166, filed Dec. 12, 1983, now U.S. Pat. No. 4,554,659. In order to facilitate a clear understanding of the instant invention, such apparatus designations have been retained and are enclosed in parenthesis to facilitate cross-reference with the application from which they were derived.

GENERAL DESCRIPTION

The present embodiment of the invention is illustrated in conjunction with a type of data communication network disclosed by M. L. Blood et al. in the aforementioned U.S. Pat. No. 4,554,659. It is to be understood, however, that the present invention is not limited to use with a data communication network so arranged but may be advantageously utilized with other types of data communication networks.

Figure 1:
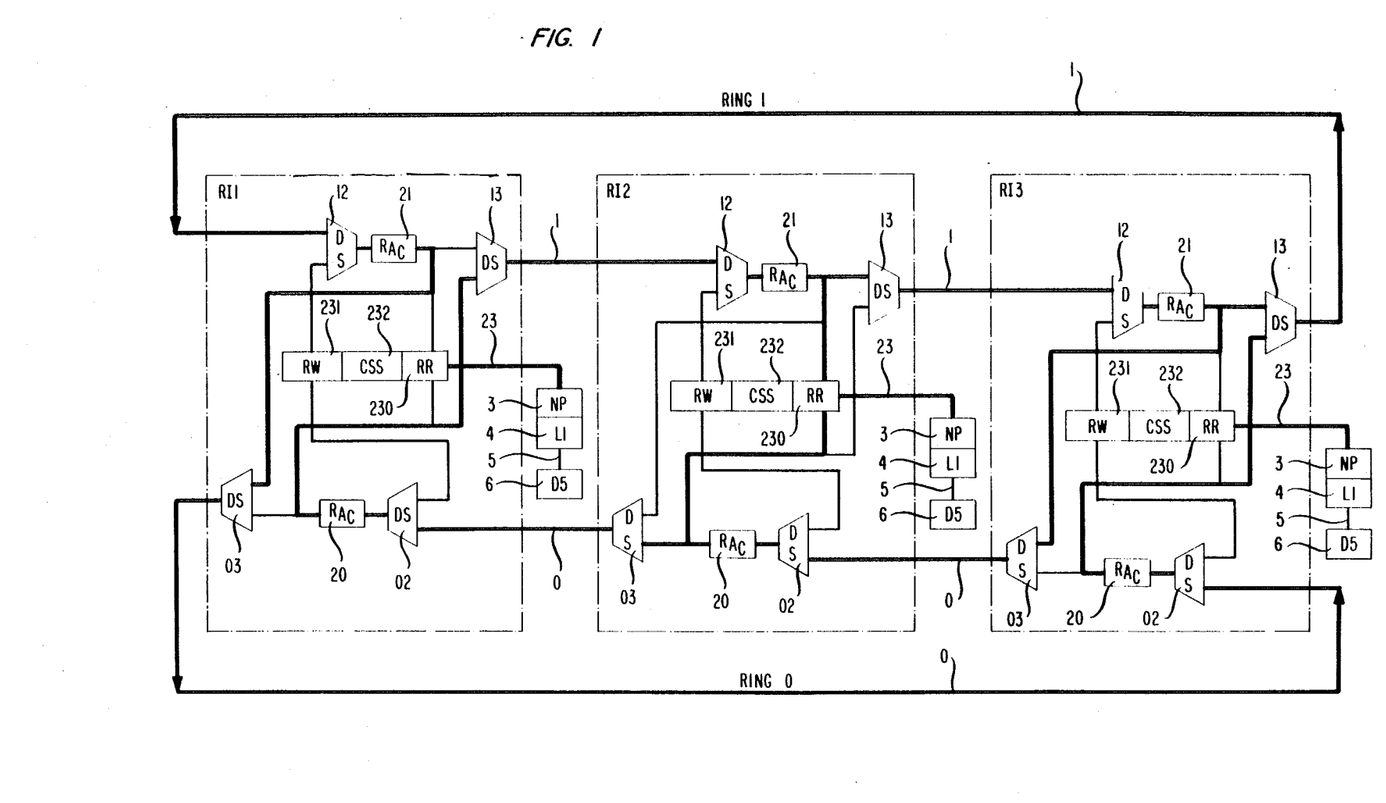
FIG. 1 is a block diagram of a data communication network embodying the principles of the instant invention.

Referring to FIG. 1 of the drawing, the data communication network set forth therein comprises ring transmission paths 0,1 interconnecting a number of nodes RI1, RI2 and RI3 each intended to couple data systems 6 with the data communication network. A node such as node RI1, is connected by a data bus 23 with a node processor 3 and with a line interface unit 4 arranged to terminate data links 5 used to couple data systems 6 with the data communication network. Data system 6 may be another data communication network or any one of a number of well-known components such as computers and data terminals, or the like, and need not be described in detail.

In a normal mode of operation a data system 6 originates data and transmits the data over a data link 5 and through a line interface unit 4 to a node processor 3.

Node processor 3 then signals the associated or source node RI1 that there is data available. Node RI1 responds to an indication of data available on data bus 23, or on ring transmission paths 0, 1, by deriving the node disposition of the data and generating a disposition available signal. Once the node disposition has been derived, node RI1 propogates the data on ring transmission paths 0, 1, through intermediate nodes such as node RI2 to destination node RI3 and over data bus 23 to node processor 3 through line interface unit 4 and data link 5 to a receiving data system 6.

Figure 3:
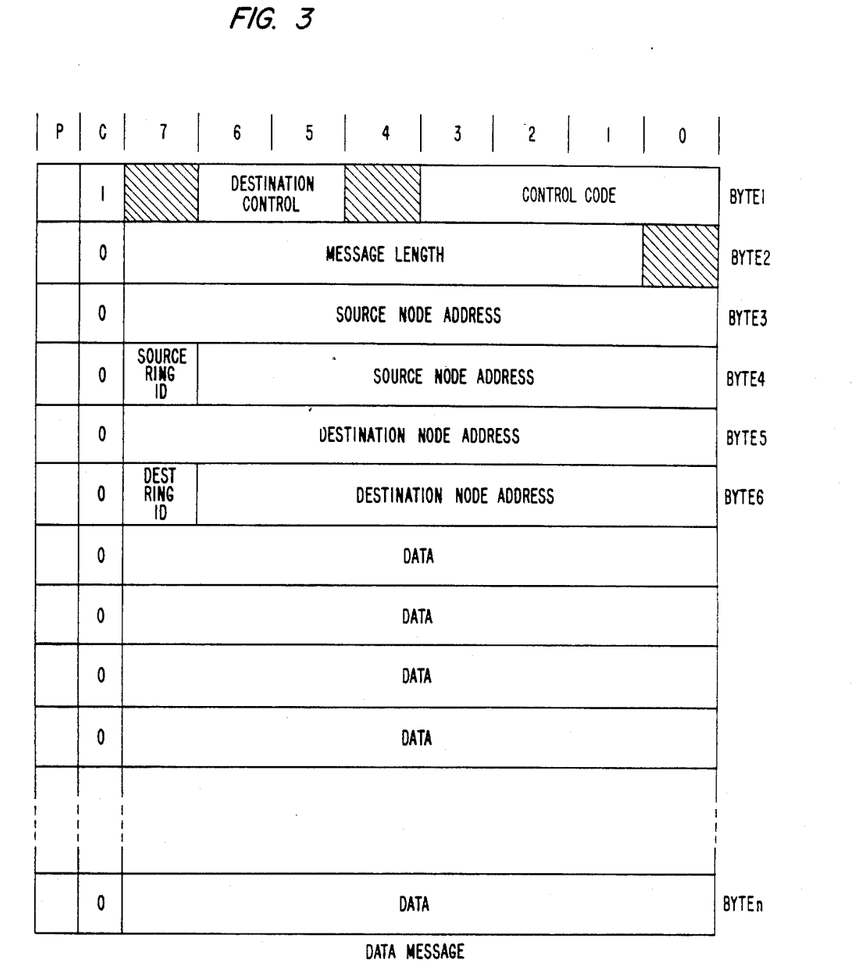
FIG. 3 is a functional diagram of the byte organization of the header portion of a network data message

Referring to FIG. 3 of the drawing, a data message appearing on the data communication network comprises a number of multi-bit data bytes. It is assumed that each data byte comprises eight bits of data and has both a control bit "C" and a parity bit "P". The first six bytes form a header for the data and identify the source node having originated the data message and the destination node that is to receive the data message. More specifically, a logical 1 appearing in the "C" bit position of the first data byte identifies the start of a data message. Bits 0 through 3 define hardware control functions of a node and bits 5 and 6 of the first data byte, hereinafter referred to as byte 1, defines the destination control of the data. For example, code 00 recorded in bits 5,6 and can be used to indicate general broadcast data that is to be received by all nodes and code 10 may be used to indicate that the data is intended for the next node directly following the node propagating the data message. Code 01 may indicate selective broadcast data sent to specific nodes and code 11 may be used to identify data that is being sent to a specific destination node. Data byte 2 may be used to specify the total number of bytes comprising the data message and bytes 3 and 4 contain the address of a node that is the source of the data message. The address of the node for which the data message is destined is identified in data bytes 5 and 6. An 0 or 1 recorded in bit 7 of data bytes 4 and 6 identifies the ring transmission paths 0, 1 on which the data message is propagated from the source node and is to be received by the destination node.

A node, for example node RI1, FIG. 1, transmits a data message to a following node RI2 by successively propagating each byte of the data message on a ring transmission path such as ring transmission path 1. If ring transmission path 1 were to open between node RI1 and node RI2, or if intermediate node RI2 was to have a circuit failure, then transmitting node RI1 would experience a blockage in attempting to propagate a data message on ring transmission path 1 to node RI2. In a short interval of time each node would experience a similar blockage of ring transmission path 1 and ring transmission path 1 would not be available to handle data.

In the exemplary embodiment of the invention each of the data communication network nodes, such as node RI1 is arranged to time the interval between successive bytes of data propagated on a ring transmission path. Should a node, such as node RI1, experience a blockage in transmitting a data message on ring transmission path 1 the ring access control apparatus 21 is controlled to flush ring transmission path 1 by force reading all of the data messages incoming to node RI1 off of ring transmission path 1 through ring read apparatus 230 and over data bus 23 into node processor 3.

After flushing ring transmission path 1 of data messages, ones of the data communication network nodes adjacent the part of the network experiencing the blockage of data, such as nodes RI1 and RI3, are controlled to reconfigure the ring transmission paths 0, 1 to isolate the segment of the network having experienced the data blockage.

More specifically, node RI1 is controlled such that ring transmission path 1 entering node RI1 through data selector 12 and ring access control apparatus RAC 21 is looped connected from the output thereof through data selector 03 with outgoing ring transmission path 0. Ring transmission path 0 incoming to node RI1 through data selector 02 and ring access control apparatus 20 is loop connected from the output thereof through selector 13 with outgoing ring transmission path 1. Similarly, node RI3 is controlled to isolate the segment of the data communication network containing node RI2 by loop connecting incoming ring transmission path 0 through data selector 02 and ring access control 20 through data selector 13 with outgoing ring transmission path 1 and incoming ring transmission path 1 through data selector 12 and ring access control apparatus 21 through data selector 03 with outgoing ring transmission path 0.

Data messages that were force read into node processor 3 associated with node RI1 and intended for nodes located on the active part of the data communication network outside of the isolated segment of the network may be read out of node processor 3 onto data bus 23. Each byte of the data message appearing on data bus 23 is read from ring write apparatus 231 through data selector 12 and propagated from ring access control apparatus 21 through data selector 03 onto ring transmission path 0. Each byte of the data message is propagated over ring transmission paths 0 and through nodes of the data communication network to a destination node serving an addressed data system 6. A data message on ring transmission path 0 incoming to node RI3 and addressed to a data system 6 served by a destination node on ring 1 is read through data selector 02 and propagated from ring access control Capparatus 20 through data selector 13 onto ring transmission path 1. Thus, the data communication network continues to serve data systems 6 coupled with the nodes located outside of the isolated segment of the network.

The active part of the data communication network, in addition to functioning to serve data system 6 connected by looped ring transmission paths 0, 1 outside of the isolated segment of the network, may be used to diagnose the nodes and ring transmission paths located within the isolated segment of the network. For example, node processor 3 of node RI1 may test the continuity of ring transmission paths 0, 1 located in the isolated segment of the network by addressing a maintenance diagnostic message to itself, storing the diagnostic message in memory, and then placing a copy of the message on data bus 23. The maintenance message is written by ring write apparatus 231 into node RI1 through data selector 02 and propagated by ring access control 20 through data selector 13 onto ring transmission path 1 of the isolated segment of the network. Each byte of the diagnostic message appearing on ring transmission path 1 at the input of node RI2 is read into ring access control apparatus 21 through data selector 12 and propagated out of data selector 13 over ring transmission path 1 to node RI3. The diagnostic message is then taken through data selector 12 of node RI3 and propagated by ring access control apparatus 21 through data selector 03 onto outgoing ring transmission path 0 coupled with node RI2. Similarly, the diagnostic message is read through data selector 02 and propagated by ring access control apparatus 20 through data selector 03 onto outgoing ring transmission path 0 extending back to node RI1. Each byte of the returned diagnostic message propagated on ring transmission path 0 from node RI2 is read through data selector 02 and propagated by ring access control 20 through ring read apparatus 230 over data bus 23 to node processor 3 associated with node RI1. The returned diagnostic message is compared by node processor 3, with the stored diagnostic message to determine the loop continuity.

If the diagnostic message failed to arrive at source node RI1 over incoming ring transmission 0 within a predetermined interval of time then node processor 3 is enabled to address and transmit another diagnostic message over ring transmission path 1 of the isolated segment of the network to destination node RI3. At destination node RI3 each byte of the diagnostic message appearing on incoming ring transmission path 1 is received by data selector 12 and ring access control apparatus 21 and propagated, via ring read apparatus 230, over data bus 23 to node processor 3. The received diagnostic message may instruct node processor 3 of node RI3 to transmit the diagnostic message over data bus 23 and ring write apparatus 231 through data selectors 02,13, via ring access control apparatus 20 and ring transmission path 1 of the active part of the data communication network to node RI1. Receipt of the transmitted diagnostic message and comparison of the original transmitted diagnostic message therewith may indicate continuity of outgoing ring transmission path 1 from node RI1 through node RI2 of the isolated segment of the data communication network to node RI3.

Node processor 3 of node RI1 may transmit a diagnostic message addressed to destination node RI3 over outgoing ring transmission path 0 of the active part of the network, via ring write apparatus 231, data selector 12, ring access control apparatus 21 and data selector 03. Node processor 3 of destination node RI3 would transmit the received diagnostic message, via ring write apparatus 231, data selector 12 and ring recess control apparatus 21, data selector 03 over outgoing ring transmission path 0 of the isolated segment of the network to node RI1. Node processor 3 of node RI1 determines from the received diagnostic message the continuity of the segmented part of ring transmission path 0 extending from node RI3 through intermediate node RI2 to node RI1.

Assuming that transmission continuity exists on the isolated segments of ring transmission paths 0,1 node processor 3 associated with node RI1 may diagnose nodes located in the isolated segment of the network, such as node RI2 by writing diagnostic messages addressed to node RI2 onto the looped ring transmission path 1 coupled with node RI2. If required, node processor 3 of node RI2 may write the diagnostic messages onto the active network by propagating bytes of the diagnostic messages on ring transmission path 1 addressed to destination node RI3. Node processor 3 of node RI3 would in turn transmit the received diagnostic message into the active part of the network by writing the received diagnostic message onto looped ring transmission path 1. Diagnostic messages addressed to destination node RI2 and appearing on ring transmission paths 0 and 1 incoming to node RI2 are read through appropriate data selectors 02, 12 and into ring access control apparatus 20, 21 and propagated through ring read apparatus 230 and over data base 23 into node processor 3. Diagnostic data messages may program node processor 3 to diagnose and record failures of the apparatus of node RI2, test and record the results of tests on operation of node processor 3, remap the memory of node processor 3, download software instructions or perform any of a number of well known test procedures used to determine the well-being and functioning status of node processor 3.

Results of the diagnostic tests may be encoded as a diagnostic data message by node processor 3, transmitted over data path 23 and written by ring write apparatus 231 through appropriate data selectors 12, 02 and propagated by ring access control apparatus 21, 20 through data selectors 13, 03 onto outgoing ring transmission paths 1 or 0. Data messages received by nodes RI1 and RI3 specifying recovery of the isolated segment of the data communication network may be used to control apparatus of the nodes RI1 and RI3 to reestablish the data communication network through these nodes. In addition, a data message may be sent by node processor 3 of nodes RI1 and RI3 to node RI2 to re-initialize node processor 3 of node RI2.

DETAILED DESCRIPTION

1. Blockage Detection

Referring to FIG. 1 of the drawing, each node RI1, RI2 and RI3 has ring access control apparatus 20, 21 associated with each ring transmission path 0, 1 and with data bus 23 coupled with node processor 3. For the present embodiment of the invention it will be assumed that each ring access control apparatus 20 and 21 is identical to the other and performs the same functions for the associated ring transmission paths 0, 1. Accordingly, the operation of one ring access control apparatus 21, FIG. 2, will be described in detail with respect to ring transmission path 1 and data bus 23 with the understanding that ring access control apparatus 20 will perform in the same manner with ring transmission path 0 and data bus 23.

Figure 2:
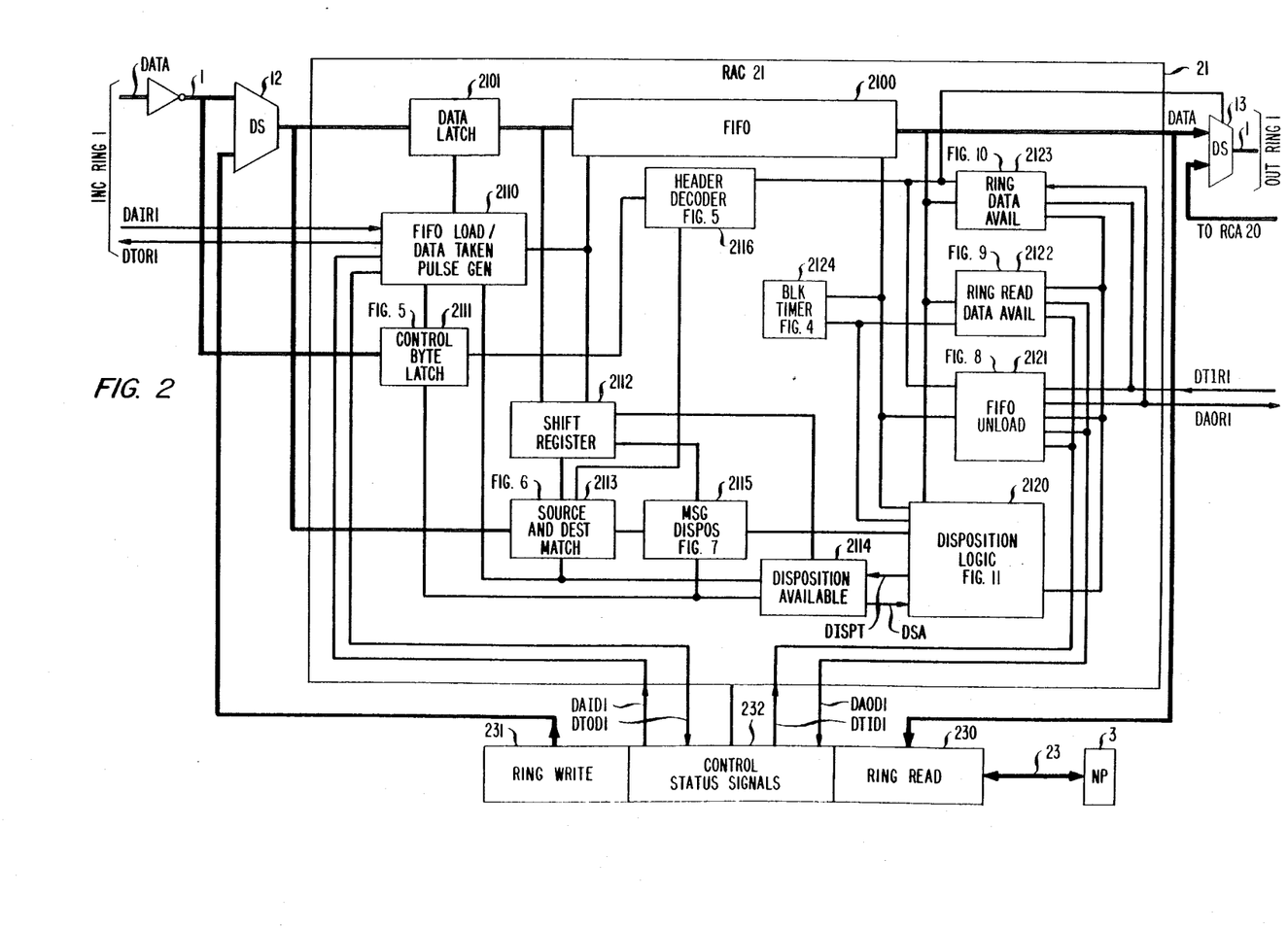
FIG. 2 is a block diagram of the ring access control apparatus of a node arranged to couple a node processor via a data bus with incoming and outgoing ring transmission paths.

Incoming and outgoing ring transmission paths 1 are each assumed to have ten parallel leads interconnecting node RI1 with a preceding node and with following node RI2. Leads 0 through 7 are used to receive and propagate eight bit bytes of data and leads 8 and 9 are used to carry the control bit "C" and parity bit "P" respectively. In addition, the data available incoming lead DAIR1 and data taken out lead DTOR1 couple node RI1 with the preceding node. The data available out lead DAOR1 along with data taken incoming lead DTIR1 couple node RI1 with following node RI2.

Node processor 3 may be coupled by a bidirectional transmission path, such as data bus 23, and control leads to ring write 231, control status signals 232, and ring read 230 apparatus of node RI1. Data may be read off of incoming ring transmission path 1 through ring read apparatus 230 onto data bus 23 and written onto outgoing ring transmission path 1 from data bus 23 through ring write apparatus 231. Data available outgoing lead DAOD1 and data taken incoming lead DTID1 are associated with ring read apparatus 230 and are used by control status signals apparatus 232 to control the reading of data onto data bus 23. Similarly, data available incoming lead DAID1 and data taken outgoing lead DTOD1 enable control status signals apparatus 232 to control the writing of data from data bus 23 onto outgoing ring transmission path 1.

Assuming that node RI1 is in the normal process of transmitting a data message over outgoing ring transmission path 1, ring access control 21 enables data available outgoing lead DAOR1 to node RI2. The enabling of data available outgoing lead DAOR1, FIG. 8, allows AND gate 21211 of FIFO unload apparatus to control NOR gate 21213 to place a low signal on lead UNCK1. A low signal appearing on lead UNCK1, FIG. 4, initializes blockage timer 2124 of ring access control apparatus 21 and 20 to start a timing interval defined by the data handling capability of the data communication network to transmit the next data byte of the data message.

Figure 8:
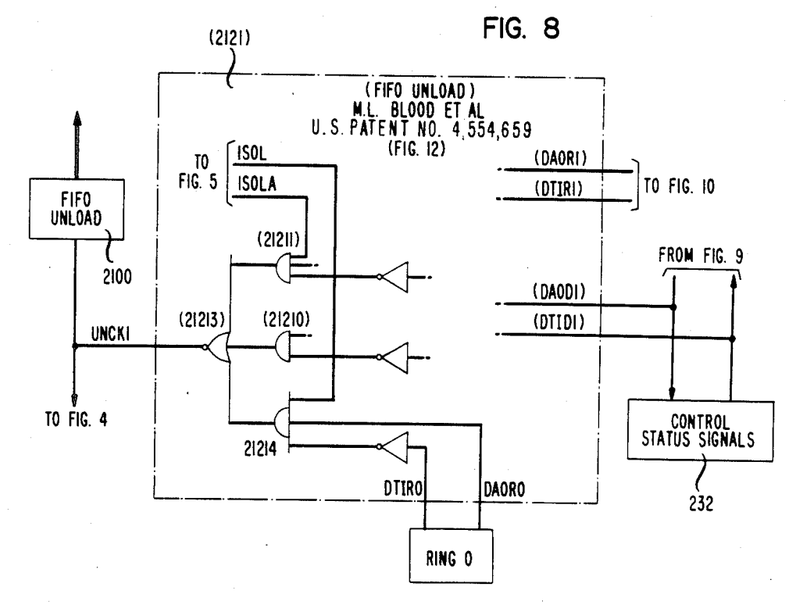
FIG. 8 sets forth logic circuitry for unloading data from a buffer store of the node.
Figure 9:
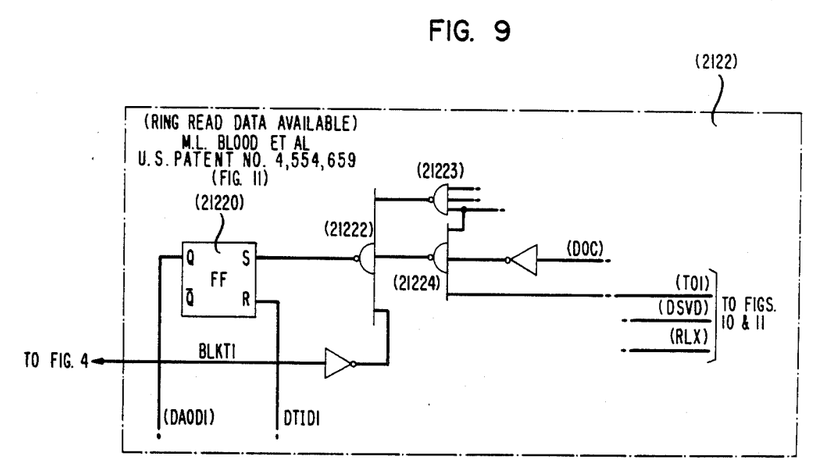
FIG. 9 shows logic circuitry of ring read data available apparatus for indicating a data message is available at a node to be read on the data bus to the node processor.

A data taken signal returned from the receiving node RI2 on data taken incoming lead DTIR1, FIG. 8, as an indication that the data byte registered in FIFO store 2100 has been taken by node RI2, inhibits AND gate 21211 to remove the low signal from lead UNCK1. The removal of the low signal from lead UNCK1 unloads the taken data byte from FIFO store 2100 and resets blockage timer 2124, FIG. 4.

Figures 4, 5:
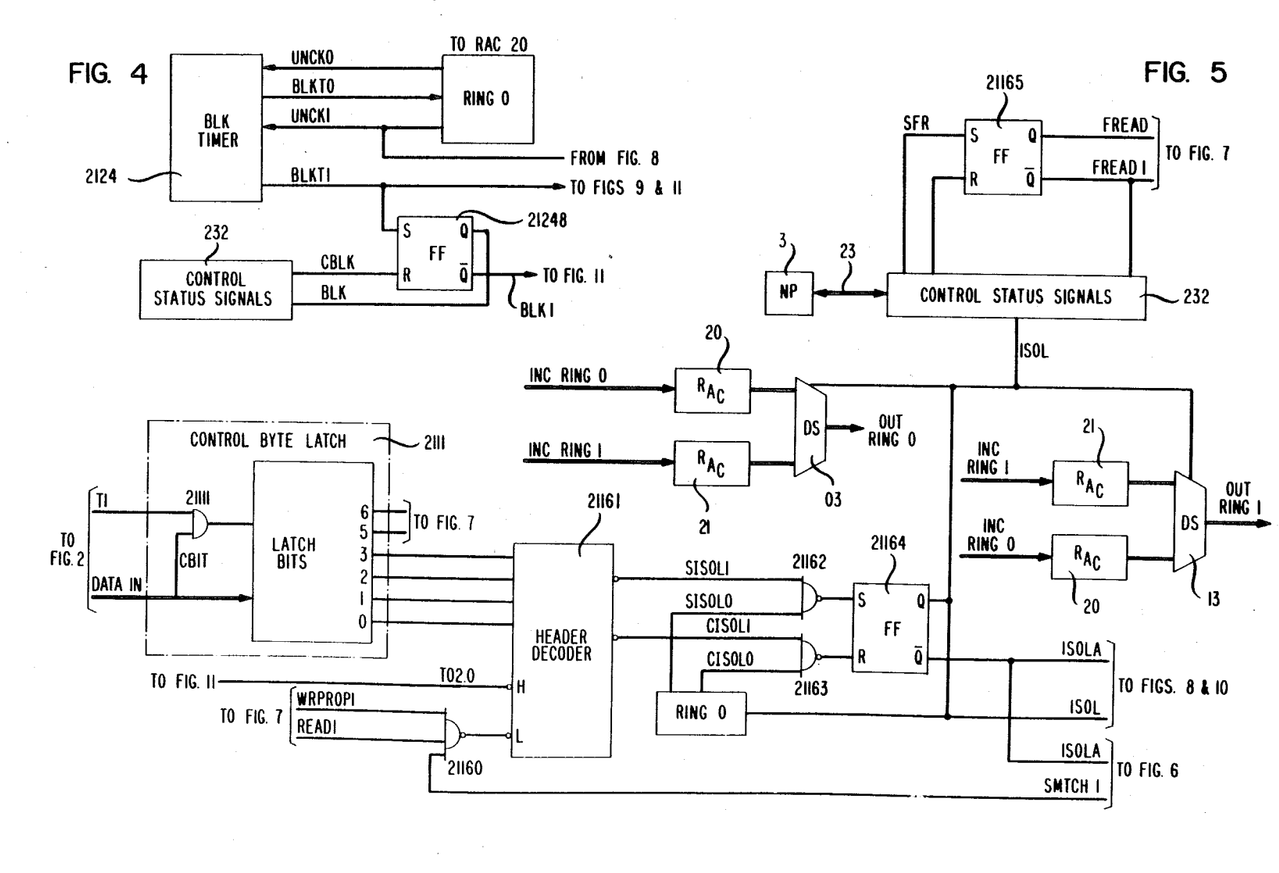
FIG. 4 illustrates a timer for detecting blockage of a data message being propagated on the network ring tranmission paths.
FIG. 5 sets forth logic circuitry of the node ring access control apparatus for interconnecting ring transmission paths to isolate a segment of the data communication network.
Figure 6:
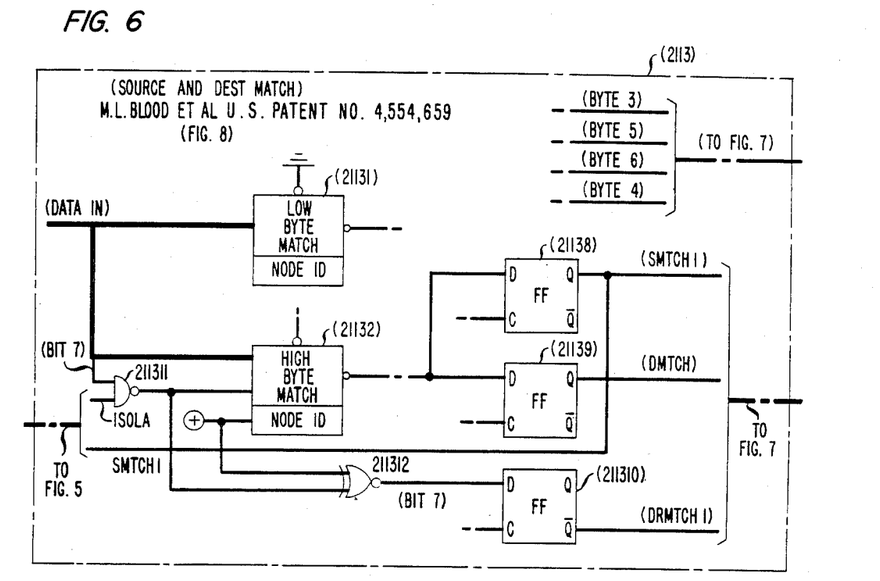
FIG. 6 shows logic circuitry of node source and destination match apparatus for matching bytes of message header data with a node identification address.
Figure 7:
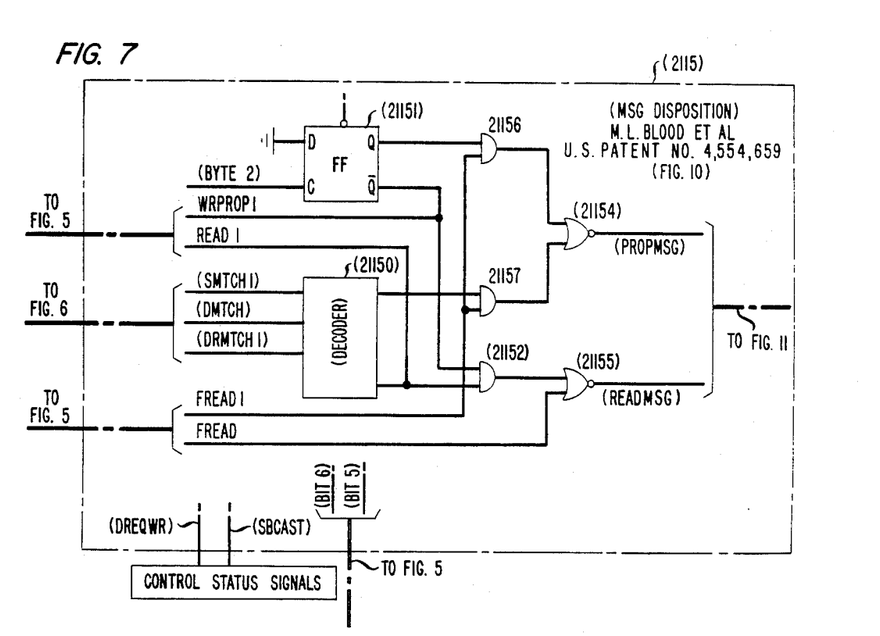
FIG. 7 shows message disposition apparatus for deriving information defining node disposition of data messages.

In the event that a blockage occurs on ring transmission path 1 because of a fault such as an open in the ring transmission path, or a failure of the apparatus or node processor 3 of node RI2, a data taken signal is not returned on data taken incoming lead DTIR1. Consequently blockage timer 2124 times out thereby placing a low signal on lead BLKT1.

Figure 11:
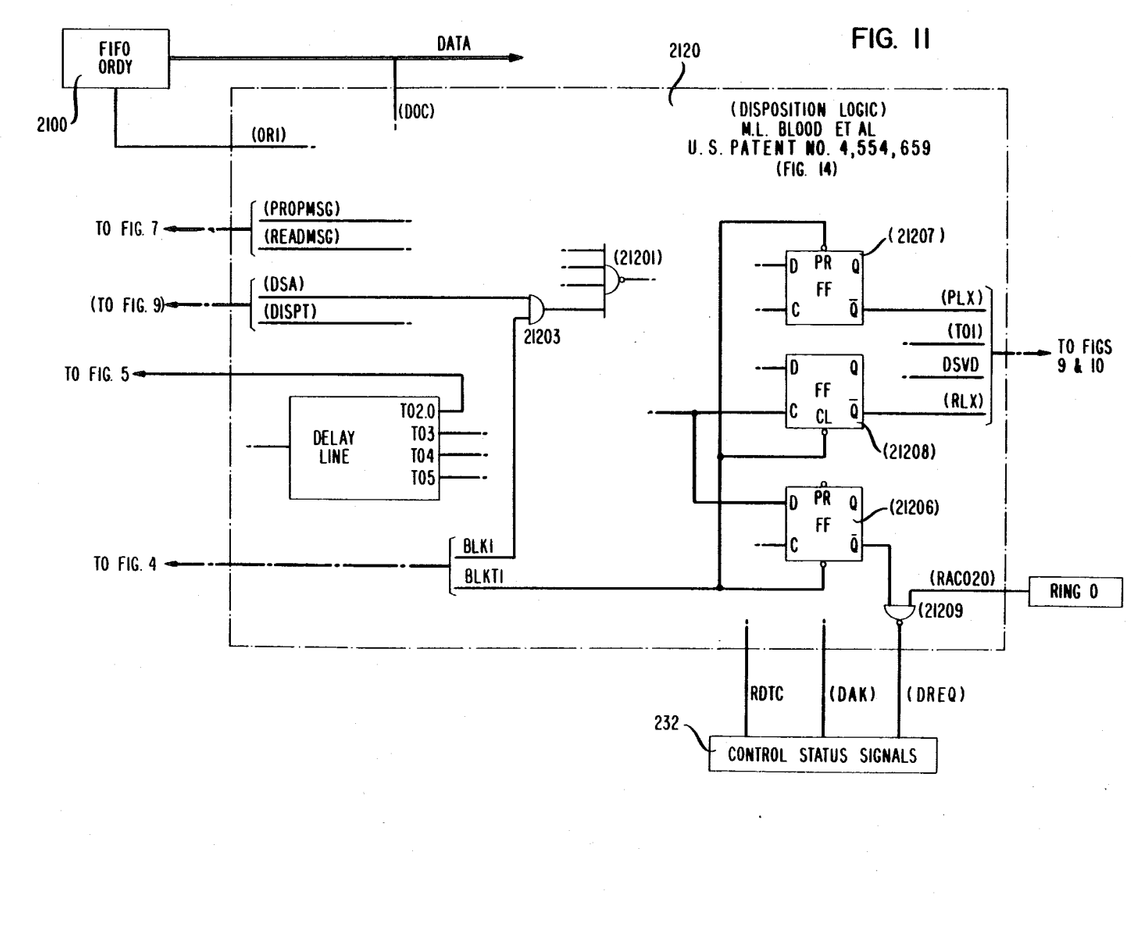
FIG. 11 shows logic circuitry of node disposition logic apparatus for controlling a node to read and propagate received data on the node data bus and outgoing ring transmission paths.

A low signal appearing on lead BLKT1 sets logic circuit 21248 to place a low signal on lead BLK1 and, FIG. 11, presets logic circuit 21207 of disposition logic 2120 to place a low signal on propagate lead PLX to thereby prevent node RI1 from further propagating data bytes onto the blocked outgoing ring transmission path 1. In addition, the low signal appearing on lead BLKT1 clears logic circuits 21208 and 21206 to enable read lead RLX and one input of NAND gate 21209. As set forth in FIG. 9 of the drawing, the low signal appearing on lead BLKT1 enables NAND gate 21222 to set logic circuit 21220 of ring read data available apparatus 2122 and thereby apply a data available signal to data available outgoing lead DAOD1. The data available signal appearing on lead DAOD1 enables control status signals 232, FIG. 2, to notify node processor 3 that a data byte located in FIFO store 2100 is waiting to be read into node processor 3. NAND gate 21209, FIG. 11, responds to the clearing of logic circuit 21206 by placing a signal on lead DREQ to notify node processor 3, via control status signals apparatus 232 and bi-directional data bus 23 that data messages are available on ring transmission path 1 incoming to node RI1.

2. Reading Blocked Data Message onto Node Processor

The data request signal appearing on lead DREQ enables control status signals apparatus 232 to notify node processor 3 of the availability of a data message. Node processor 3 acknowledges the data request signal by directing control status signals apparatus 232, via data bus 23, to enable lead DAK to disposition logic apparatus 2120.

A data byte appearing at the output of FIFO store 2100, FIG. 2, is read from ring access control apparatus 21 through ring read apparatus 230 and over data bus 23 to node processor 3. Node processor 3 responds to receipt of the data byte by enabling data taken incoming lead DTID1 via data bus 23 and ring read apparatus 230. Lead DTID1, FIG. 9, resets logic circuit 21220 of ring read data available apparatus 2122 to remove the high signal on data available outgoing lead DAOD1 and inhibits the other input of AND gate 21210, FIG. 8. Inhibited AND gate 21210 places a low signal on an input of NOR gate 21213 which in turn enables lead UNCK1 to unload the data byte from FIFO store 2100. The next byte of data appearing at the output of FIFO store 2100 enables lead OR1, FIG. 11, to cause deposition logic apparatus 2120 and ring read data available apparatus 2122 to place a data available signal on lead DAOD1 to control status signals apparatus 232.

Thus, ring transmission path 1 is flushed of blocked data messages by force reading each data byte of the data message off of incoming ring transmission path 1 into node processor 3. As set forth in FIG. 2 of the drawing each byte of incoming data appearing at the output of FIFO store 2100 enables disposition logic apparatus 2120 to control ring read data available apparatus 2122 to place a data available signal on lead DAOD1 indicating that a data byte is available to node processor 3. Node processor 3 acknowledges receipt of the available data byte by returning a data taken signal on lead DTID1 to reset ring read data available apparatus on 2122 and enable FIFO unload apparatus 2121 to unload the taken data byte from FIFO store 2100. The data available and data taken sequence is continued to read the remainder of the blocked data message incoming to node RI1 on ring transmission path 1 into node processor 3.

3. Flushing the Network

The time out of blockage timer 2124, FIG. 4, caused a low signal to be applied to lead BLK1. The low signal appearing on lead BLK1, FIG. 11, inhibits AND gate 21203 of disposition logic apparatus 2120 to prevent NAND gate 21201 from being enabled by a disposition available signal appearing on lead DSA. Inhibiting AND gate 21203 at this time prevents another data message incoming into node RI1 from being propagated from the node onto an outgoing ring transmission path or read into node processor 3 while node RI1 is preparing to read bytes of the blocked data message into node processor 3.

Node processor 3 initiates the process of flushing the ring transmission paths of data messages, FIG. 5, by controlling control status signals apparatus 232 to place an enabling signal on lead SFR to set logic circuit 21165. Set logic circuit 21165 applies a high and low signal respectively, to leads FREAD and FREAD1 extending to message disposition apparatus 2115, FIG. 7. A low signal appearing on lead FREAD1 inhibits AND gates 21156 and 21157 to place low signals on the input of NOR gate 21154 thereby placing a high lead PROPMSG. A high signal on lead PROPMSG causes logic circuit 21207 of disposition logic apparatus 2120, FIG. 11, to maintain a low signal on lead PLX to ring data available apparatus 2123, FIG. 10, to thereby inhibit data from being propagated on blocked outgoing ring transmission path 1. A high signal appearing on lead FREAD enables NOR gate 21155 of message dispositon apparatus 2115, FIG. 7, to maintain a high signal on lead READMSG as an indication that data messages incoming to node RI1 are to be read off of the incoming ring transmission path into node processor 3.

Node processor 3 resets the blockage timer logic circuit 21248 via control status signals apparatus 232, FIG. 4, to place a high signal on lead BLK1 and partially enable AND gate 21203 of disposition logic 2120, FIG. 11. Thus, on subsequent data messages incoming to node RI1 the disposition available signal generated by the dispositon available apparatus 2114, FIG. 2, is accepted and a disposition taken signal is returned by disposition logic 2120 on lead DISPT. Disposition logic 2120 in response to the signal appearing on the lead READMSG controls the ring read data available apparatus 2122 and FIFO unload apparatus 2121 to flush the network of data messages by successively reading each data byte from FIFO store 2100 through ring read apparatus 230 over data bus 23 into node processor 3.

4. Isolating the Network

Referring now to FIG. 2 of the drawing, node processor 3 of node RI1 addresses a data message to a another node saying that it has experienced a blockage in propagating a data message over ring transmission path 1 to node RI2. The blockage message is then written over data bus 23 through ring write apparatus 231 and data selector 02, FIG. 1, into ring access control 20 and propagated on the unblocked ring transmission path 0 to a control node. The control node upon receiving the blockage message generates isolation messages identified by a specific control code, FIG. 3, located in bits 0 through 3 of byte 1 of the isolation messages and indicates the destination thereof by placing the address of the destination node RI1 in bytes 5 and 6 of one message and the address of node RI3 in another message. The isolation messages are progated on ring transmission paths 0, and 1 to nodes RI3 and RI1, respectively.

Control code bits 0 through 3 of the first data byte of the isolation message appearing on incoming ring transmission path 1 of node RI1, FIG. 2, are registered in control byte latch 2111 and applied, FIG. 5, to the input of header decoder 21161. As successive bytes of the incoming isolation message are received the source and destination match apparatus 2113, FIG. 6, determines from bytes 3 and 4 that the incoming isolation message was generated by another node and applies a high signal to lead SMTCH1. After receivingn bytes 5 and 6 the source and destination match apparatus 2113 determines that the incoming isolation message is destined for this node and places a low signal on lead DMTCH. Upon receiving the low signal on lead DMTCH, message disposition apparatus 2115, FIG. 7, places a high signal on lead READ1 to indicate that the incoming message is to be read by node RI1.

With high signals appearing on leads READ1, SMTCH1 and WRPROP1, NAND gate 21160, FIG. 5, places a low signal on an enable input of header decoder 21161 so that a strobe signal appearing on lead T02.0 enables header decoder apparatus 21161 to decode the control code of the isolation message into a low signal on lead SISOL1. A low signal on lead SISOL1 enables NAND gate 21162 to set logic circuit 21164 and apply a high signal on lead ISOL. The high signal appearing on lead ISOL notifies node processor 3, via control status signals apparatus 232, that node RI1 has been set to the isolate state. In addition, the high signal appearing on lead ISOL sets data selectors 03 and 13. Data selectors 03 and 13 are switches and are arranged such that data selector 13, FIG. 1, normally couples incoming ring transmission path 1 through ring access control apparatus 21 to outgoing ring transmission path 1 and data selector 03 normally couples incoming ring transmission path 0 through ring access control apparatus 20 to outgoing ring transmission path 0. Upon operation of data selectors 03 and 13 incoming ring transmission path 1 is loop connected via ring access control 21 and data selector 03 with outgoing ring transmission path 0. Similarly, incoming ring transmission path 0 is loop connected via ring access control 20 and data selector 13 with outgoing ring transmission path 1. Since nodes RI1 and RI3, FIG. 1, each received an isolation message that the segment of the data communication network that contains node RI2 has been isolated from the active part of the data communication network.

Figure 10:
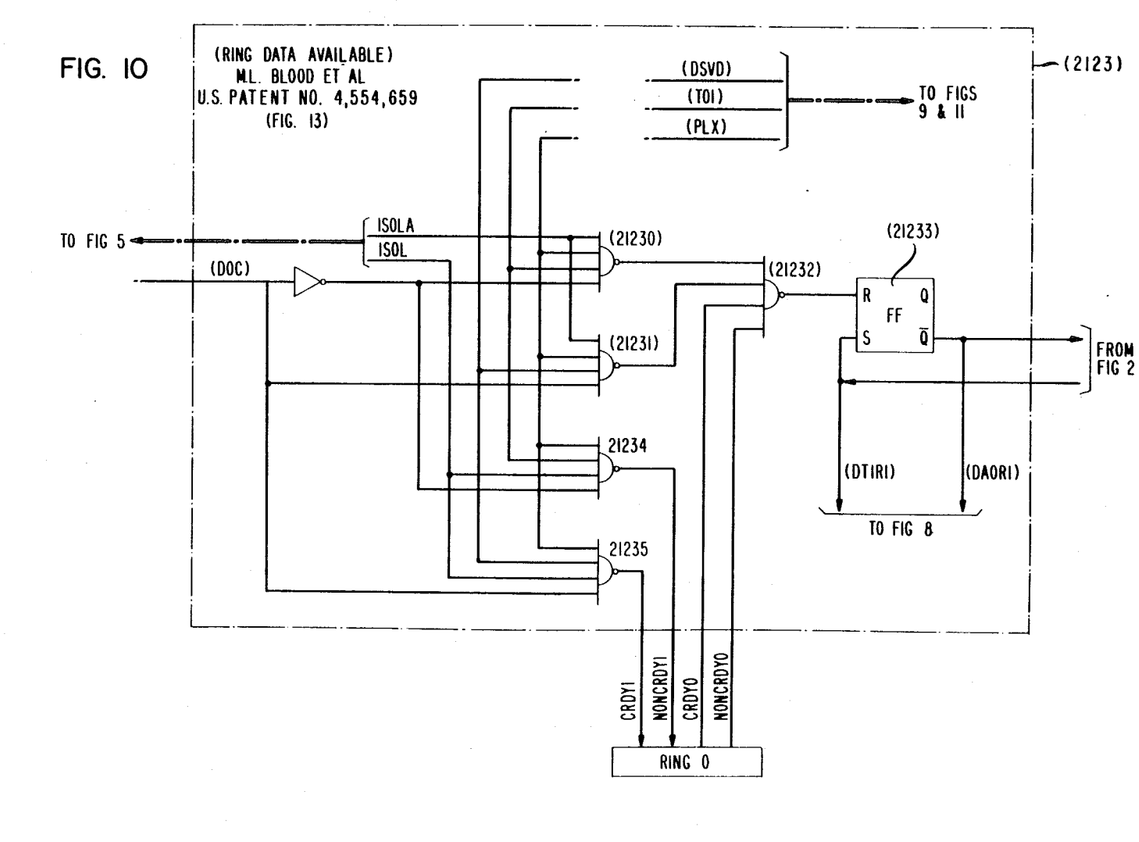
FIG. 10 shows logic circuitry of ring read available apparatus for indicating data is available for propagation on outgoing ring transmission paths coupled with a node.

A high signal appearing on lead ISOL partially enables NAND gates 21234 and 21235 of the ring data available apparatus 2123, FIG. 10, so that the signals generated by disposition logic apparatus 2120 of ring access control 21 in response to data messages coming into node RI1 on ring transmission path 1 will be transferred via leads CRDY1 and NOCRDY1, to ring access control apparatus 20 to control the data available lead DAOR0 associated with outgoing ring transmission path 0. The low signal appearing on lead ISOLA enables NAND gates 21230 and 21231 to place high signals on inputs of NAND gate 21232. NAND gate 21232 will be controlled while node RI1 is in the isolate mode by signals appearing on leads CRDY0 and NONCRYDY0 to set logic circuit 21233 and thereby enable data available lead DAOR1 for outgoing ring transmission path 1.

Similarly, the high signal appearing on lead ISOL partially enables AND gate 21214, FIG. 8, of the FIFO unload apparatus 2121 so that the data available and taken leads DAOR0 and DTIR0 associated with outgoing ring transmission path 0 will control the unloading of FIFO store 2100 associated with incoming ring transmission path 1. The low signal appearing on lead ISOLA inhibits AND gate 21211 to prevent the unloading of FIFO store 2100 by the data available and taken leads DAOR1 and DTIR1 associated with outgoing ring transmission path 1. The low signal appearing on lead ISOLA, FIG. 6, causes NAND gate 211311 of source and destination match apparatus 2113 to place a high signal on an input of exclusive OR gate 211312 and maintains a high signal on lead BIT 7 to insure that logic circuit 211310 maintains a low signal on lead DRMTSCH1 to disable destination ring ID matching.

5. Propagating Data Messages on the Looped Network

A data message originated by a source node on the data communication network and intended for a destination node, for example, node RI3, FIG. 1, may appear on incoming ring transmission path 1 of node RI1. Since node RI1 has been set to the isolate node each byte of the incoming data message is propagated out over ring tranmission path 0 to destination node RI3. When a data available signal appears on lead DAIR1, FIG. 2, byte 1 of the header portion of the incoming message is loaded, via data selector 12 and data latch 2101, into FIFO store 2100 and a data taken signal returned on lead DTOR1 to the previous node. Subsequent bytes of the header portion of the data message are loaded by the data available and taken sequence into FIFO store 2100. Control byte latch apparatus 2111 and source and destination match apparatus 2113, FIG. 6, determine that the incoming message is intended for another node and thereby enable decoder 21150 of message disposition apparatus 2115, FIG. 7, to place a signal on lead PROPMSG as an indication that the incoming data message is to be propagated from node RI1 on ring transmission path 0 to another node. After the message disposition information has been derived the disposition available apparatus 2114, FIG. 2, enables lead DSA to indicate that the incoming data message disposition information is available. Disposition logic 2120, FIG. 11, in response to the message disposition and disposition available information and to the appearances of message header byte 1 at the output of FIFO store 2100, enables lead PLX to ring data available apparatus 2123, FIG. 10. Since the C bit is one in the first data byte of the header all inputs to logic gate 21235 are high thereby causing a low signal to appear on lead CRDY1 extending to ring access control 20 associated with ring transmission path 0. A low signal appearing on lead CRDY1 of the ring data available apparatus 2123 for ring access control 20 would be similar as a low signal appearing on lead CRDY0 from ring access control 20. That is the low signal on lead CRDY1 would enable a NAND gate in ring access control 20 similar to NAND gate 21232 to reset a logic circuit such as logic circuit 21233 and place a data available signal on lead DAOR0 associated with ring transmission path 0.

The data available signal on lead DAOR0 from ring transmission path 0 in combination with the high signal on lead ISOL, FIG. 8, enables AND gate 21214 of Fifo UNload apparatus 2121 to cause NOR gate 21213 to place a low signal on lead UNCK1. When the data byte is taken by ring transmission path 0, data taken lead DTIR0 sets the logic circuit of the ring data available apparatus of ring access control 20 to remove the high signal on lead DAOR0 and inhibits the other input of NAND gate 21214 to place a low signal on an input of NOR gate 21213 which enables lead UNCK1 to unload data byte 1 from FIFO store 2100 of ring access control 21.

Subsequent bytes of the data message appearing on incoming ring transmission path 1 and at the output of FIFO store 2100 result in the enablement of NAND gate 21234 of the ring data available apparatus 2123, FIG. 10, to place a low signal on lead NONCRDY1 extending to ring 0. Similar to lead NONCRDY0, the low signal on lead NONCRDY1 enables a NAND gate and logic circuit of ring data available apparatus of ring access control 20 to enable data available lead DAOR0 associated with outgoing ring transmission path 0. A data taken signal returned on lead DTIR0 sets logic circuitry to restore the data available lead DAOR0 and enable the logic circuitry of FIFO unload apparatus 2121, FIG. 8, to unload each data byte in succession from FIFO store 2100.

6. Reading Data Messages Off a Looped Transmission Path

A data message originated by a source node on the data communication network and addressed to a node set on the isolated state such as node RI1, FIG. 1, is read off the incoming ring transmission path 1 through ring read apparatus 230 over data bus 23 into node processor 3. The header portion of the incoming data message is decoded by the message disposition apparatus 2115 which enables lead READMSG, FIG. 7, extending to disposition logic apparatus 2120, FIG. 11. When the disposition available signal appears on lead DSA the disposition logic apparatus 2120 enables NAND gate 21223 of ring read data available apparatus 2122, FIG. 9. NAND gate 21223 enables NAND gate 21222 to set logic circuit 21220 to place a data available signal on lead DAOD1 to control status signals apparatus 232, FIG. 2. When node processor 3 accepts the byte of data, a data taken signal is placed on lead DTID1 by control status signals apparatus 232 to reset logic circuit 21220, FIG. 9, of ring read data available apparatus 2122 and enable the logic of FIFO unload apparatus 2121, FIG. 8, via NAND gate 21210 and NOR gate 21213, to unload the taken data byte from FIFO store 2100. The data available and data taken sequence is continued for each byte of the incoming data message that is received over incoming ring transmission path 1 and read from FIFO store 2100, FIG. 2, through ring read apparatus 230 and over data bus 23 into node processor 3.

7. Propagating Maintenance and Diagnostic Messages on the Isolated Segment of the Network.

Node processor 3 may write maintenance and diagnostic messages from node RI1, FIG. 1, through ring write apparatus 231 and data selector 02 into ring access control 20. Assuming that outgoing ring transmission path 1 from node RI1 is clear, maintenance and diagnostic messages, hereinafter referred to as diagnostic messages, are propagated from ring access control 20 through data selector 13 on outgoing ring transmission path 1 to node RI2. Ring access control 20 for the purpose of the instant invention is assumed to be identical to ring access control 21 and the following sequence will for ease of understanding be explained as though ring access control 21 of FIG. 2 is in fact ring access control 20.

Each byte of a maintenance and diagnostic message appearing on data bus 23 causes control status signals apparatus 232 to place a data available signal on lead DAID0. FIFO load/data taken pulse generator 2110 of ring access control 20 loads each incoming data byte from ring write apparatus 231 through data selector 02 into FIFO store 2100. The header position of and diagnostic messages enables the message disposition apparatus 2115 to enable lead PROPMSG and when the disposition available signal appears on lead DSA, the disposition logic apparatus 2120, enables ring data available apparatus 2123 of ring 0 to place a low signal on lead CRDY0. The low signal appearing on lead CRDY0, FIG. 10, enables NAND gate 21232 to reset logic circuit 21233 to enable data available lead DAOR1 associated with outgoing ring transmission path 1 of the isolated segment of the data communication network. A data taken signal returned on lead DTIR1 enables logic circuit 21233 to remove the data available signal from lead DAOR1 and from the equivalent AND gate 21214 and NOR gates 21213, FIG. 8, of FIFO unload apparatus 2121 of ring 0 to unload the taken data byte from the FIFO store of ring access control 20. The data available and data taken sequence is continued to propogate and maintenance diagnostic messages over outgoing ring transmission path 1 to isolated node RI2. If outgoing ring transmission path 1 is still blocked then node RI1, FIG. 1, could send maintenance and diagnostic messages via ring write apparatus 231 and data selector 12, to ring access control 21. The messages would be propagated over outgoing ring transmission path 0 through data selector 02 of node RI3 and ring access control 20 to node processor 3 via read apparatus 230 and data link 23. The received maintenance and diagnostic messages, would then be sent, via ring write apparatus 231 and data selector 12, to ring access control 21 which in turn would propagate each byte of the diagnostic message through data selector 03 over outgoing ring transmission path 0 of the isolated segment of the network to node RI2.

8. Maintenance and Diagnostic Messages

Maintenance and diagnostic messages, hereinafter referred to as diagnostic messages, generated by source node RI1 can be addressed to node RI1 as destination node and propagated on outgoing ring transmission path 1 on the isolated segment of the network. The diagnostic message would, assuming continuity of the ring transmission paths 0,1, of the isolated segment of the network, be propagated through node RI2 on ring transmission path 1, looped through node RI3 to outgoing ring transmission 0 and return through node RI2 to addressed destination node RI1. Node processor 3 can then compare the transmitted diagnostic message with the received diagnostic message to determine continuity of the ring transmission paths of the isolated network.

If the diagnostic message was blocked at node RI1 or was not returned on incoming ring transmission path 0, node RI1 can propagate the diagnostic messages over outgoing ring transmission path 0 to node processor 3 of node RI3. Node processor 3 of node RI3 can then propagate the diagnostic message over outgoing ring transmission path 0 of the isolated segment of the network through node RI2 to destination node RI1 to test the continuity of ring transmission path 0. Similarly, node processors of nodes RI1 and RI3 can propagate diagnostic messages in the priorly described manner to node processor 3 of node RI2 to diagnose the circuitry of both the node and the node processor. Results of the diagnostic tests performed on node RI2 and the node processor of node RI2 can be propagalted over outgoing ring transmission paths 0,1 of the isolated part of the network to nodes RI1 and RI3 to enable maintenance personnel to diagnose problems occurring in the isolated part of the network. Nodes RI1 and RI3 can also propagate diagnostic messages received from the isolated segment of the network over ring transmission paths 0,1 of the active part of the network to a node that may be designated as a network maintenance center.

9. Restoration of the Network

Assuming that the blockage and the apparatus of the isolated part of the network have been repaired, the isolated segment of the network may be restored to normal operation by the control code, FIG. 3, of a restoral message. The control code of the first byte of the restoral message received by nodes RI1 and RI3 is recorded by control byte latch apparatus 2111, FIG. 5. Clear isolate data recorded in bits 0 through 3 of the first byte of a restoral message enable header decoder 21161 to apply a low signal to NAND gate 21163 to reset logic circuit 21164. Reset logic circuit 21164 removes the high signal from lead ISOL to restore data selectors 03 and 13 and to inform node processor 3, via control status signals apparatus 232, that the node is being returned to the normal state. Restored data selector 03, FIG. 1, reconnects incoming ring transmission path 0 through data selector 02 and ring access control 20 to outgoing ring transmission path 0. Similarly, data selector 13 reconnects incoming ring transmission path 1 through data selector 12 and ring access control 21 to outgoing ring transmission path 1. The low signal appearing on lead ISOL also causes NAND gates 21234 and 21235, FIG. 10, to place a high signal, respectively, on leads CRDY1 and NONCRDY1 and the high signal appearing on lead ISOLA partially enables NAND gates 21230 and 21231.

SUMMARY OF THE INVENTION

It is obvious from the foregoing that the facility, economy and efficiency of data communication may be substantially enhanced by a data communication network arranged to communicate with an isolated part of the network experiencing trouble. It is further obvious from the foregoing that a data communication network arranged to automatically isolate a part of the network experiencing trouble and to maintain data communication between an active part of the network and the isolated segment thereof improves the ease of maintaining data communication networks.

What is claimed is:

1. A method for maintaining a data communication network having ring transmission paths interconnected by nodes each coupled with a node processor and data systems comprising the steps of isolating failing segments of the data communication network by enabling ones of the nodes to loop connect ones of the ring transmission paths together, and communicating with ones of the nodes located in said isolated failed segments from the part of the data communication network which has not failed by transferring data messages between ones of said loop connected ring paths.

2. The method of maintaining the data communication network set forth in claim 1 wherein said isolating step comprises the steps of detecting a failure of one of the nodes to take a byte of a data message being received from a propagating one of the nodes, and signaling the node processor of said propagating node that a blockage has occurred in propagating a data message to said receiving node.

3. The method of maintaining the data communication network set forth in claim 2 wherein said isolating step further comprises step of controlling said propagating node by said signaled node processor to force read bytes of said blocked data message incoming on ones of said ring transmission paths into said signaled node processor.

4. The method of maintaining the data communication network set forth in claim 3 wherein said isolating step further comprises the steps of interconnecting ones of the ring transmission paths to isolate a segment of the data communication network having experienced said blockage of data, and transferring control of node apparatus for generating data available signals on outgoing ring transmission paths normally associated with incoming ones of the ring transmission paths to ones of the interconnected outgoing ring transmission paths normally associated with other incoming ones of the ring transmission paths.

5. The method of maintaining the data communication network set forth in claim 4 wherein said communicating step comprises the step of receiving successive bytes of diagnostic data messages propagated on ones of said ring transmission paths incoming from an active part of the network and reading said received bytes into the node processor of one of the node.

6. The method of maintaining the data communication network set forth in claim 5 wherein said communicating step further comprises the step of propagating bytes of said received diagnostic data messages addressed to isolated ones of the nodes on outgoing ones of said interconnected ring transmission paths coupled with said isolated segment of the data communication network.

7. The method of maintaining the data communication network set forth in claim 6 wherein saidd communicating step further comprises the step of reading ones of diagnostic data messages received by said one node data processor from said isolated segment of the network into said one node and propagating each data byte of said read diagnostic data message on a ring transmission path outgoing to said active part of the network.

8. A method for maintaining a data communication network having ring transmission paths interconnected by nodes each having a data bus interconnecting the node with a node processor and data systems comprising the steps of detecting a blockage of a node propagating a data message on one of said ring transmission paths outgoing to a receiving one of the nodes.

reading bytes of said blocked data message off of one of said ring transmission paths incoming to said blocked node into the node processor of said blocked node, flushing the data communication network of data messages by force reading said data messages of said incoming of the ring transmission paths at said blocked node into said blocked node processor, isolating segments of said flushed data communication network by enabling ones of the nodes to loop connect ones of the ring transmission paths together, and communicating with ones of the nodes located in said isolated segments of the data communication network by transferring data messages between said one node processors and said loop connected ring transmission paths.

9. The method for maintaining the data communication network set forth in claim 8 wherein said blockage detecting step comprises the steps of timing the interval between successive bytes of data messages propagated on said outgoing ring transmission paths, and signaling the node processor of said propagating node that a blockage of propagating data has occurred when said timing interval exceeds a predefined value.

10. The method for maintaining the data communication network set forth in claim 9 wherein said blocked data message reading step comprises the steps of inhibiting said blocked node from propagating said blocked data message on said outgoing ring transmission paths, and enabling said blocked node to read remaining bytes of said blocked data message off of said incoming ring transmission paths over the data bus into the blocked node processor.

11. The method for maintaining the data communication network set forth in claim 10 wherein said flushing step comprises the step of controlling said blocked node to dispose of data messages appearing on said incoming ring transmission paths subsequent by said blocked data message by force reading bytes of said subsequent data messages into said blocked node processor.

12. The method for maintaining the data communication network set forth in claim 11 wherein said isolating step comprises the steps for interconnecting incoming ones of the ring transmission paths normally coupled with one outgoing ring transmission path to another outgoing ring transmission path at ones of the nodes, and transferring control of node apparatus for generating data available signals on said one outgoing ring transmission path to said other outgoing ring transmission path.

13. The method for maintaining the data communication network set forth in claim 12 wherein said communicating step comprises the steps of reading bytes of diagnostic data messages addressed to nodes located is said isolated segments of the network off of ring transmission paths incoming from an active part of the data communication network of said one nodes into the processors, and propagating bytes of said read diagnostic data messages from said one node processors addressed to said isolated nodes on said interconnected other outgoing ring transmission paths coupled with said isolated segments of the data communication network.

14. The method for maintaining the data communication network set forth in claim 13 wherein said communicating step further comprises the steps of taking bytes of diagnostic data messages propagated on incoming ones of said ring transmission paths interconnected with said isolated nodes and reading said taken diagnostic data message bytes into said one node processors, and writing said isolated node diagnostic data messages from said one node processors by propagating successive bytes thereof on one of the ring transmission paths outgoing to said active part of the network.

15. A method for maintaining a data communication network having ring transmission paths interconnected by nodes each coupled with a node proessor and data systems comprising the steps of timing intervals between successive bytes of data messages propagated on outgoing ones of the ring transmission paths, signaling the node processor of a propagating one of the nodes that a blockage has occurred in propagating a data message on one of said outgoing ring transmission paths when one of said timing intervals exceeds a predefined value, inhibiting said blocked node from propagating said blocked data message on said one outgoing ring transmission path, enabling said blocked node to read remaining bytes of said blocked data message of said of incoming ring transmission paths into the node processor of said blocked node, flushing the data communication network of data messages by force reading successive bytes of data messages into incoming on said ring transmission paths into said blocked node processor, isolating segments of the flushed data communication network at ones of the nodes by loop connecting incoming ones of the ring transmission paths normally coupled with one outgoing ring transmission path to another outgoing ring transmission path, transferring control of node apparatus for generating data available signals and data taken signals on said one outgoing ring transmission path to said other outgoing ring transmission path, taking bytes of diagnostic data messages propagated on first ones of said looped connected ring transmission paths incoming to said one nodes from said active part and said isolated segments of the data communications network and reading said diagnostic data message bytes into said one node processors, and writing said diagnostic data bytes from said one node processors into said one nodes and propagating said diagnostic data bytes on second ones of said looped connected ring transmission outgoing from said blocked node to said active part and said isolated segment of the data communication network.

16. A node for maintaining a data communication network having ring transmission paths interconnected by a plurality of the nodes each coupled with a node processor and data systems comprising means for detecting failure of one of the nodes to take a data message being received from the maintenance node, means responsive to said detecting means for flushing the data communication network of data messages, means for isolating segments of the flushed data communication network experiencing failures by loop connecting ones of the ring transmission paths together to isolate a segment of the data communication network from an active part of the data communication network, and means for communicating with isolated ones of the nodes by reading diagnostic data messages off ones of said loop connected ring transmission paths into the node processor and writing said diagnostic data messages from the node processor onto others of the loop connected ring transmission paths.

17. The maintenance node set forth in claim 16 wherein said failure detecting means comprises means for timing an interval between when a byte of said data message is available and is taken by said receiving node, and means enabled by said timing means exceeding a predetermined interval of time for signaling the maintenance node processor that a blockage has occurred in propagating said data message.

18. The maintenance node set forth in claim 17 wherein said failure detecting means further comprises means enabled by said timing means exceeding a predetermined interval of time for inhibiting the maintenance node from propagating remaining bytes of said blockaged data message on outgoing ones of said ring transmission paths.

19. The maintenance node set forth in claim 18 wherein said flushing means comprises means responsive to said signaled maintenance node processor for force reading said blocked data message and data messages subsequently incoming to the maintenance node on incoming ones of the ring transmission paths into the maintenance node processor.

20. The maintenance node set forth in claim 19 wherein said flushing means comprises means responsive to enablement of said force reading means for inhibiting the maintenance node from propagating said incoming data messages on outgoing ones of the ring transmission paths.

21. The maintenance node set forth in claim 20 wherein said isolating means comprises means for interconnecting one of said outgoing ring transmission paths normally coupled with one of said incoming ring transmission paths to another one of said incoming ring transmission paths.

22. The maintenance node set forth in claim 21 wherein said isolating means further comprises means enabled by said interconnecting means for transferring control of node apparatus for generating data available signals on said one outgoing ring transmission path normally associated with said one incoming ring transmission path to said other one outgoing ring transmission path loop connected with said incoming ring transmission path.

23. The maintenance node set forth in claim 22 wherein said communicating means comprises means for propagating successive bytes of diagnostic messages generated by said maintenace node processor on outgoing ones of said ring transmission paths associated with said isolated segments of the data communication network, and means for receiving successive bytes of diagnostic messages propagated on ones of said ring transmission paths incoming from said isolated segment of the data communication network and propagating each received diagnostic message byte on ones of the ring transmission paths outgoing to said active part of the data communication network.

24. The maintenance node set forth in claim 21 wherein said isolating means comprises means enabled by predetermined bits of a first byte of an incoming data message and by said node maintenance processor for setting the maintenance node to an isolate state and clearing a set isolated maintenance node to a clear state.

25. A node for maintaining a data communication network having a pair of ring transmission paths interconnecting a plurality of the nodes each having a data bus coupled with a node processor and data systems comprising means for timing intervals between when a byte of a data message is available and is taken by a receiving one of the nodes, the nodes, means enabled by said timing means exceeding a predetermined interval of time for signaling the maintenance node processor that a blockage has occurred in propagating a byte of said data message, means enabled by said timing means exceeding said predetermined interval of time for inhibiting the maintenance node from propagating succeeding bytes of said blocked data message on an outgoing one of said ring transmission paths, means responsive to said signaled maintenance node processor for force reading successive bytes of said blocked data message and data messages incoming to the maintenance node on incoming ones of the ring transmission paths into the maintenance node processor, means responsive to enablement of said force reading means for inhibiting the maintenance node from propagating said incoming data messages on outgoing ones of the ring transmission paths means for loop connecting a first outgoing one of the ring transmission paths normally coupled with a first incoming one of the ring transmission paths to a second incoming one of the ring transmission paths to isolate a segment of the data communication network, means for interconnecting a second outgoing one of the ring transmission paths normally coupled with said second incoming ring transmission path to said first incoming ring transmission path to maintain operation of an active part of the data communication network, means enabled by said interconnecting means for transferring control of maintenance node apparatus for generating data available signals on said first and second outgoing ring transmission paths normally associated with corresponding first and second incoming ring transmission paths to said second and first outgoing ring transmission paths loop connected respectively with said first and second incoming ring transmission paths, and means for receiving successive bytes of diagnostic data messages on ones of said looped ring transmission paths and transferring diagnostic data messages to other ones of said loop connected ring transmission paths by propagating each diagnostic data message byte in a parallel bit format on the outgoing ring transmission path of said other loop connected ring transmission paths.

* * * * *